US012671359B2

(12) United States Patent
Tomolillo

(10) Patent No.: US 12,671,359 B2
(45) Date of Patent: Jun. 30, 2026

(54) SOLAR PANEL MOUNT AND METHOD OF ASSEMBLY

(71) Applicant: Solar Slate Solutions, Billerica, MA (US)

(72) Inventor: David Tomolillo, Billerica, MA (US)

(73) Assignee: Solar Slate Solutions, Billerica, MA (US)

( * ) Notice: Subject to any disclaimer, the term of this patent is extended or adjusted under 35 U.S.C. 154(b) by 0 days.

(21) Appl. No.: 18/785,562

(22) Filed: Jul. 26, 2024

(65) Prior Publication Data

US 2025/0038699 A1    Jan. 30, 2025

Related U.S. Application Data

(60) Provisional application No. 63/529,209, filed on Jul. 27, 2023.

(51) Int. Cl.
*H02S 20/30*        (2014.01)

(52) U.S. Cl.
CPC .................................... *H02S 20/30* (2014.12)

(58) Field of Classification Search
None
See application file for complete search history.

(56) References Cited

U.S. PATENT DOCUMENTS

| | | | | |
|---|---|---|---|---|
| 8,122,648 | B1 * | 2/2012 | Liu ......................... | F24S 25/61 |
| | | | | 52/173.3 |
| 9,447,988 | B2 * | 9/2016 | Stearns ................... | E04D 13/00 |

| | | | | |
|---|---|---|---|---|
| 10,673,374 | B2 * | 6/2020 | Robinson .................. | E04D 1/30 |
| 12,074,558 | B2 * | 8/2024 | Neal ........................ | F24S 25/61 |
| 2011/0247295 | A1 * | 10/2011 | Stearns ................... | E04D 13/14 |
| | | | | 248/237 |
| 2013/0299655 | A1 * | 11/2013 | Sader ...................... | H02S 20/23 |
| | | | | 248/295.11 |
| 2016/0134230 | A1 * | 5/2016 | Meine ..................... | H02S 20/23 |
| | | | | 52/698 |
| 2018/0274238 | A1 * | 9/2018 | Aliabadi ................. | E04D 13/00 |
| 2019/0131917 | A1 * | 5/2019 | Tomolillo ............. | F16B 5/0614 |
| 2020/0116191 | A1 * | 4/2020 | Uppu ...................... | H02S 20/00 |
| 2020/0400272 | A1 * | 12/2020 | Patton ..................... | F24S 25/61 |
| 2021/0359638 | A1 * | 11/2021 | McPheeters ............ | F24S 25/30 |
| 2023/0184276 | A1 * | 6/2023 | Katz ....................... | H02S 20/20 |
| | | | | 403/376 |
| 2023/0336108 | A1 * | 10/2023 | Morano ................ | F24S 25/613 |

FOREIGN PATENT DOCUMENTS

| | | | | |
|---|---|---|---|---|
| EP | | 2662646 A1 * | 11/2013 | ............ F24S 25/615 |

* cited by examiner

*Primary Examiner* — Steven M Marsh
(74) *Attorney, Agent, or Firm* — Bay State IP, LLC

(57)        ABSTRACT

A solar panel mount includes a first plate, a mounting bracket, a mounting shaft, a fastener member, a mounting member, and a rotatably adjustable spacer. The first plate is configured to slide beneath a roofing tile. The first plate comprises at least one opening. The rotatably adjustable spacer is sized to be at least partially received in the mounting member when the mounting member receives the mounting shaft. The rotatably adjustable spacer is configured to receive the mounting shaft. The spacer is rotatably adjustable allowing for the entire solar panel mount to be raised and lowered so that the mount is completely flush with the roofing material, and further allowing the solar panel mount to withstand weather events and other forces.

9 Claims, 12 Drawing Sheets

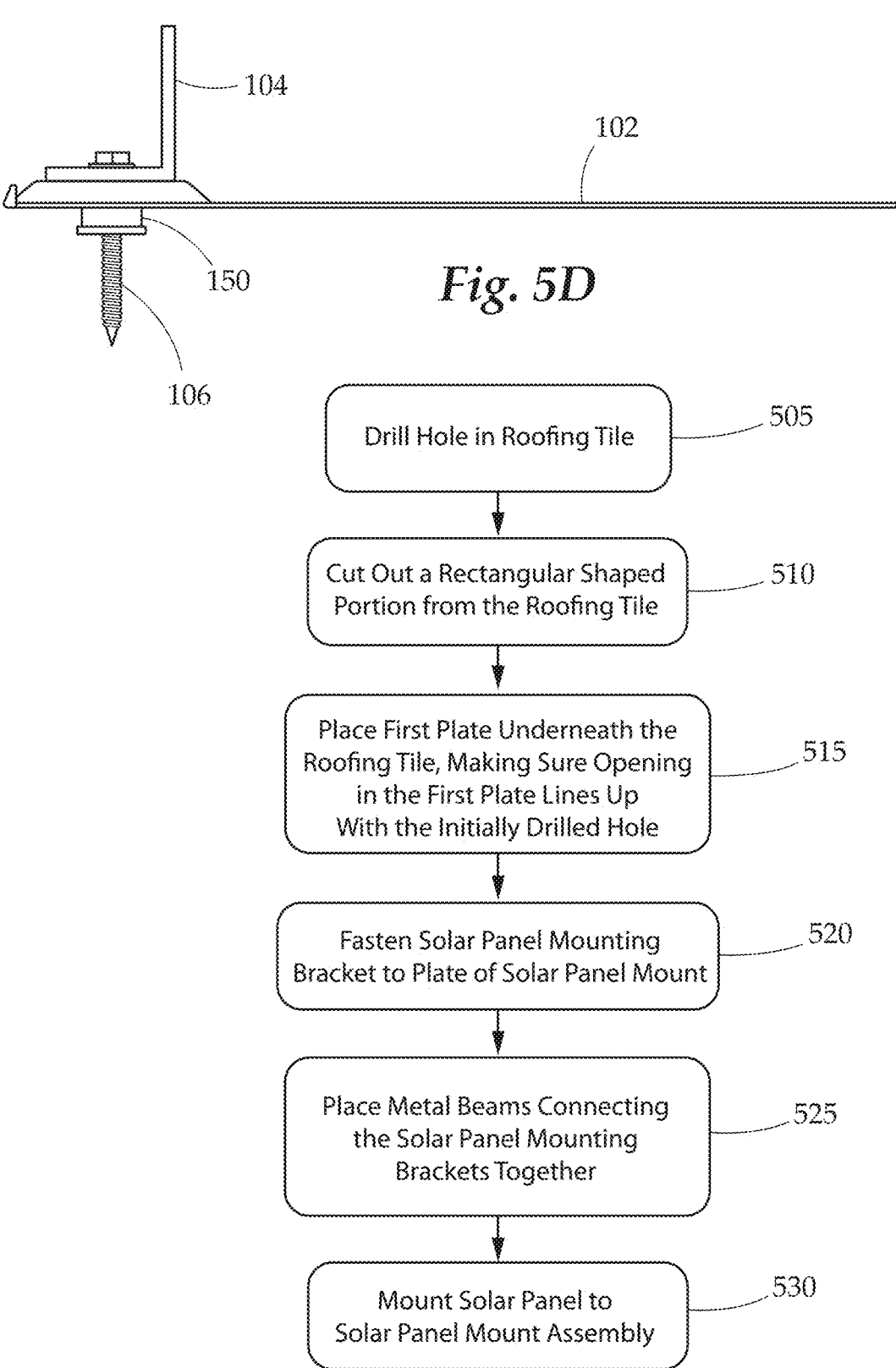

Drill Hole in Roofing Tile — 505

Cut Out a Rectangular Shaped Portion from the Roofing Tile — 510

Place First Plate Underneath the Roofing Tile, Making Sure Opening in the First Plate Lines Up With the Initially Drilled Hole — 515

Fasten Solar Panel Mounting Bracket to Plate of Solar Panel Mount — 520

Place Metal Beams Connecting the Solar Panel Mounting Brackets Together — 525

Mount Solar Panel to Solar Panel Mount Assembly — 530

*Fig. 6*

SOLAR PANEL MOUNT AND METHOD OF ASSEMBLY

CROSS REFERENCE TO RELATED APPLICATION

This application claims the benefit of and takes priority from U.S. Provisional Patent Application Ser. No. 63/529,209, filed on Jul. 27, 2023, the contents of which are herein incorporated by reference.

FIELD OF INVENTION

The present invention relates generally to mounts, such as roof mounts and panel mounts. In particular, the present application relates to a solar panel mount for mounting a solar panel on a roof, such as a slate roof constructed from a plurality of slate roof tiles. With the use of a rotatably adjustable spacer, the solar panel may be mounted to the roof more easily while also being able to absorb natural forces without disrupting the integrity of the roofing material.

BACKGROUND OF THE INVENTION

Since 2008, hundreds of thousands of solar panels have popped up across the country, with more individuals placing solar panels on their homes. Solar energy is an increasingly popular source of electrical energy. Solar energy is typically harvested using solar panels. These solar panels may be mounted on rooftops, such as on the roof of a residential home or commercial building. These rooftops are often covered in shingles or other similar roofing materials. Accordingly, the solar panels must be mounted to these roofs in such a way as to not disturb the roofing material.

Particular problems arise when the roofing material includes a plurality of tiles or shingles, such as slate roof tiles, which must first be removed such that the solar panel can be secured directly to the roof, rather than through the roof tiles. Replacing the plurality of roof tiles once the solar panel has been secured to the roof is a difficult and arduous process, which affects the integrity of the roof and significantly increases costs associated with mounting solar panels to roofs with slate roof tiles.

SUMMARY OF THE INVENTION

According to an embodiment, a solar panel mount includes a first plate, a mounting bracket, a mounting shaft, a fastener member, a mounting member, and a rotatably adjustable spacer. The first plate is configured to slide beneath a roofing tile. The first plate comprises at least one opening. The mounting bracket is preferably L-shaped and comprises a channel for the mounting shaft to slide through and the mounting shaft is further secured by the fastener member. The mounting member is comprised of at least one opening to be aligned with the at least one opening of the plate and the channel of the mounting bracket when the mounting member is received in a beveled cavity. The rotatably adjustable spacer is sized to be at least partially received in the mounting member when the mounting member receives the mounting shaft. The rotatably adjustable spacer is configured to receive the mounting shaft. The spacer is rotatably adjustable allowing for the entire solar panel mount to be raised and lowered so that the mount is completely flush with the roofing material, and further allowing the solar panel mount to withstand weather events and other forces. The solar panel mount may further comprise a sealant or a sealant and a rubber gasket that seals and protects the solar panel mount from weather conditions.

BRIEF DESCRIPTION OF THE DRAWINGS

The advantages of the present invention will be apparent from the following brief description of exemplary embodiments thereof, which description should be considered in conjunction with the accompanying drawings. Having thus described the invention in general terms, reference will now be made to the accompanying drawings, which are not necessarily drawn to scale, and wherein:

FIG. 5D is a side view of the solar panel mount;

FIG. 6 is a flow diagram of a method of assembling a solar panel mount according to an exemplary embodiment.

DETAILED DESCRIPTION OF THE SEVERAL EMBODIMENTS

Figure 1A:
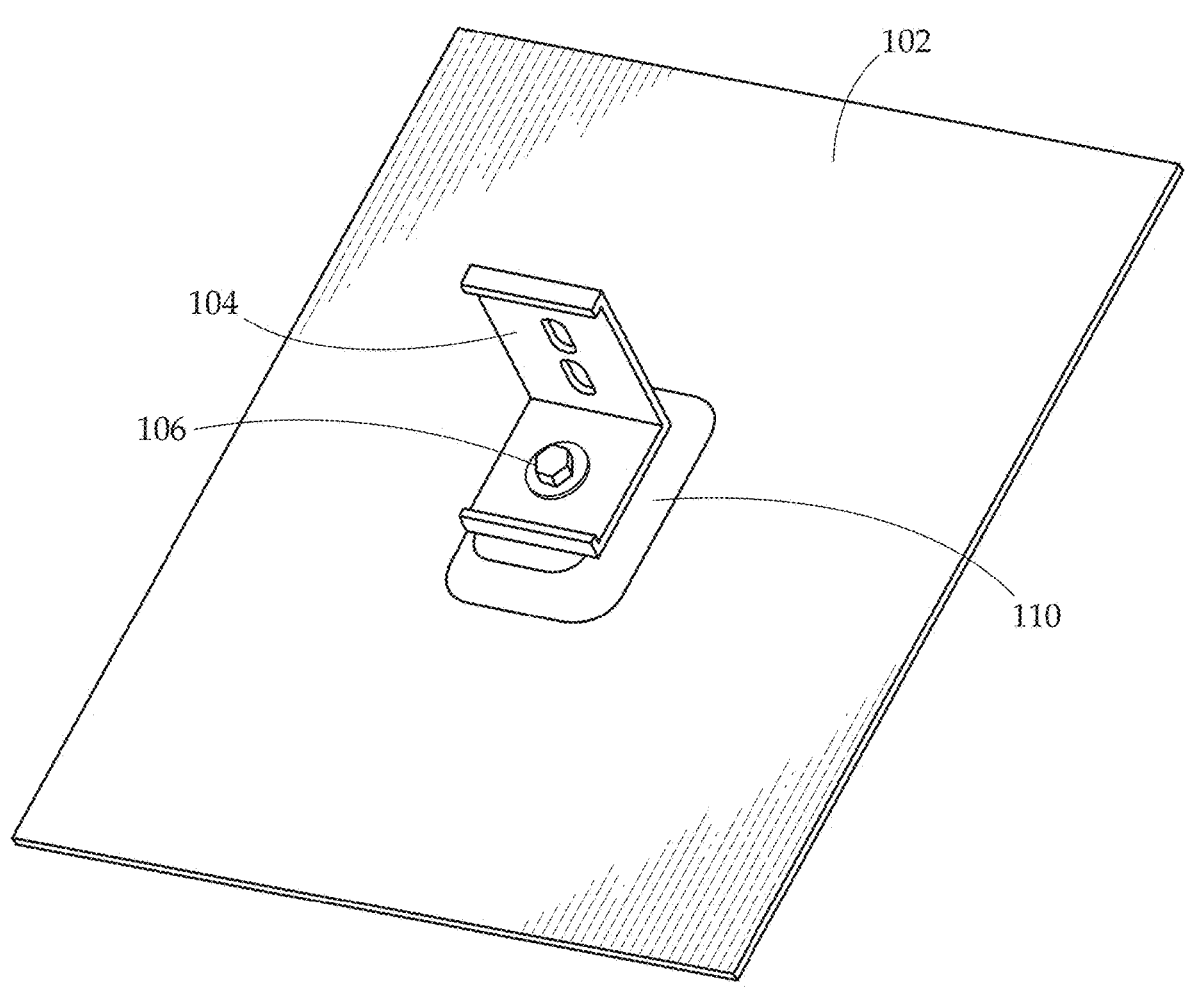
FIG. 1A is a top perspective view of a solar panel mount, according to an exemplary embodiment.
Figure 1B:
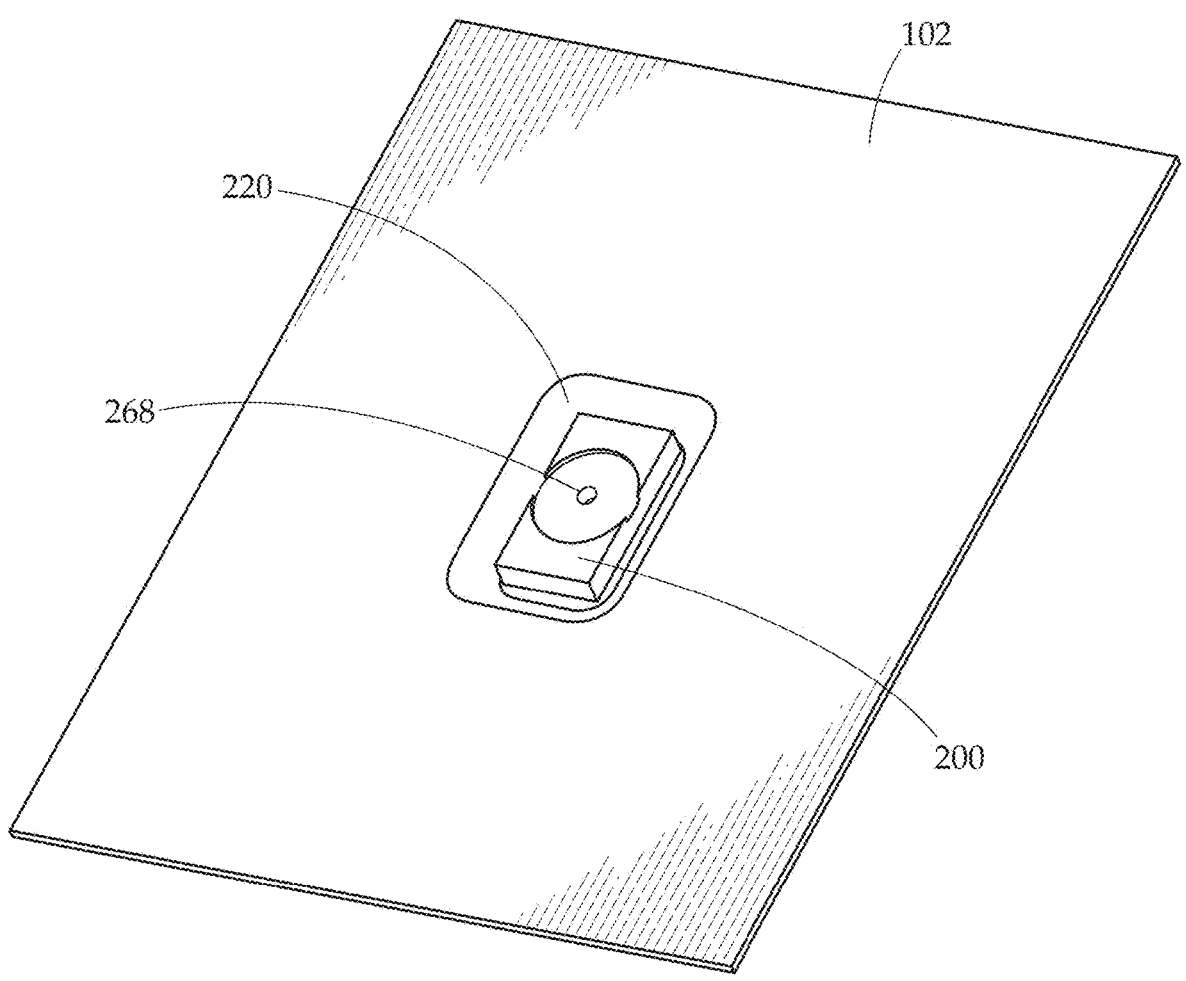
FIG. 1B is a bottom perspective view of the solar panel mount of FIG. 1A
Figure 1C:
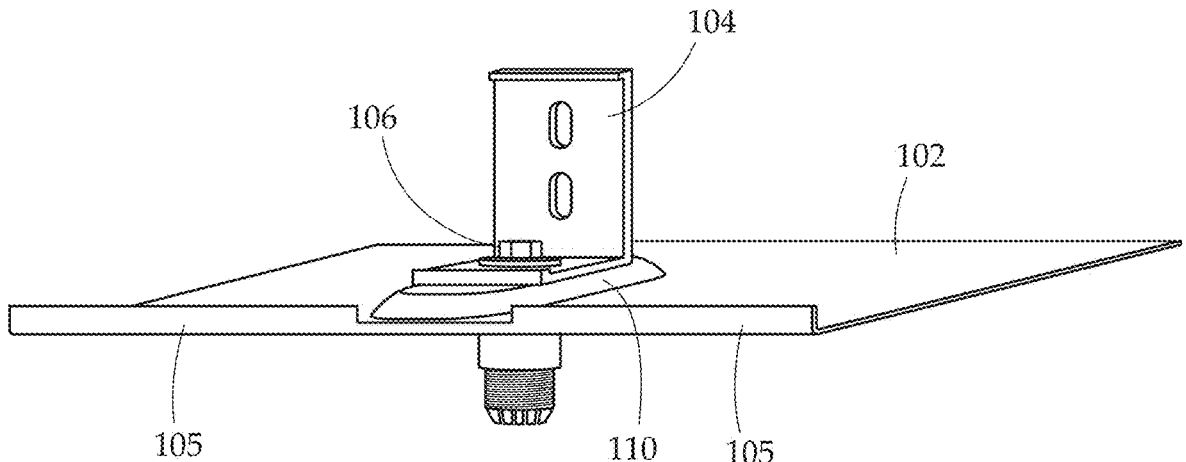
FIG. 1C is a top perspective view of a solar panel mount, according to another exemplary embodiment.
Figure 1D:
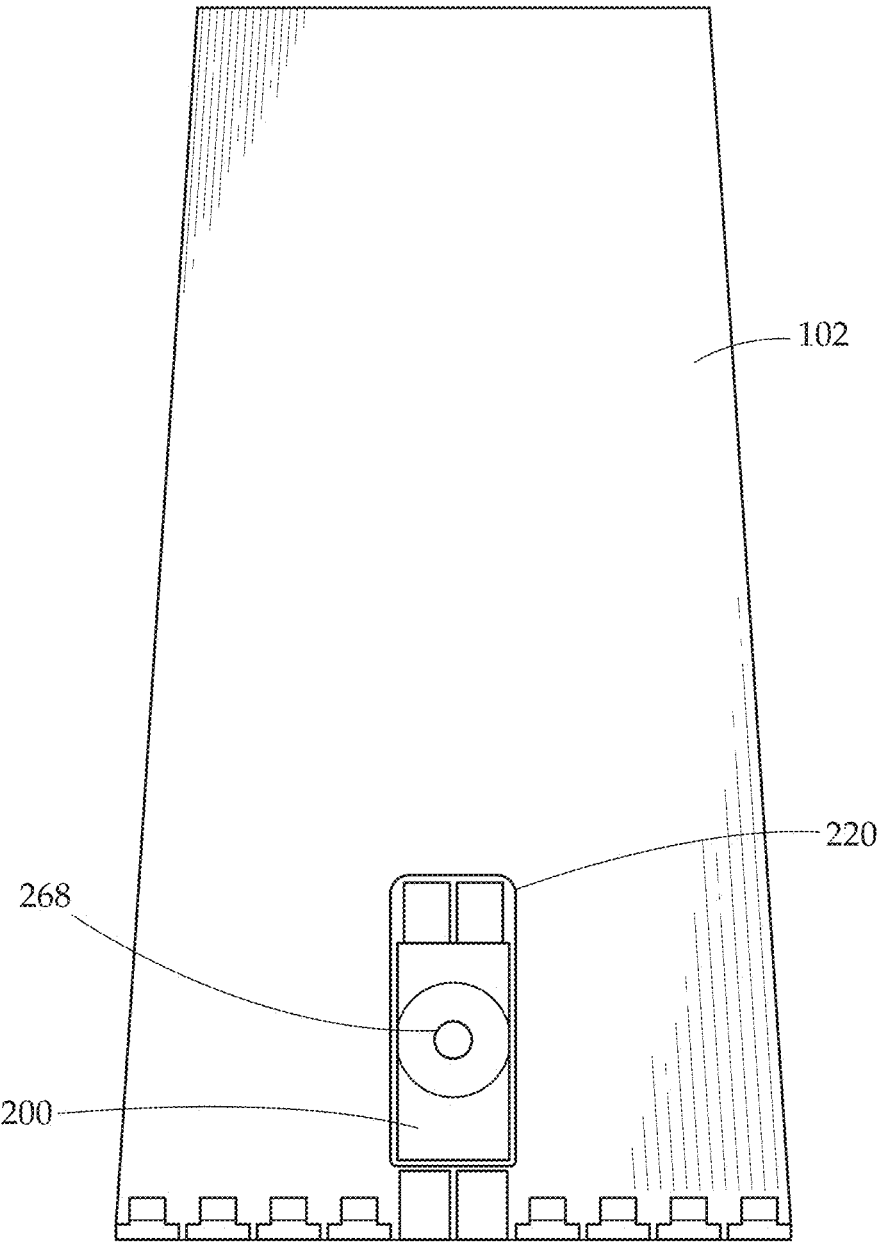
FIG. 1D is a bottom perspective view of the solar panel mount of FIG. 1C.

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

In various roofing installations, the structural integrity of the roof can be difficult to maintain over time when a solar panel mount is used to attach a solar panel to the roof. In particular, the roofing tiles may be initially manufactured and installed in a particular manner to maintain structural integrity over time, including being water-tight or otherwise leak-resistant. The structural integrity may depend on specific relationships in force, distance, and/or material connections amongst roofing tiles—particularly in terms of managing forces in a direction normal to a general plane defined by the roofing tiles—that may be necessary to maintain structural integrity. The present solution implements a rotatably adjustable spacer with the solar panel mount to enable the solar panel mount to maintain structural integrity and allow the solar panel mount to align with the surrounding roofing material.

It will be appreciated that the present solution can thus be installed on roofs of various materials, including but not limited to slate, stone, French tile, pre-cut tiles, synthetic tiles, shingles, or concrete, without disrupting structural integrity. For example, many roofing systems rely on compression between roofing tiles for long-term stability; the present solution can compensate for altered tiles by providing a rotatably adjustable spacer that provides even and constant force within the system allowing for the mount to be securely placed and maintains the longevity of the roof structure. In addition, it will be appreciated that such improvements are enabled by the present solution even when only a single roof tile is removed from the roof (or no roof tiles are removed from the roof; rather, the tile may be cut in place without removal of any tiles) as part of the installation process. The method of assembling the solar panel mount includes drilling a small hole in roof tile and cutting out a rectangular box around the hole from a roof tile, allowing for the plate of the mounting system to be slid underneath the existing roof tile and locked into place using a mounting bracket and rotatably adjustable spacer.

Referring now to FIGS. 1A-1D show the solar panel mount in more detail. The solar panel mount 100 includes a first plate 102 and a solar panel mounting bracket 104 that can be coupled to the first plate 102 by a mounting shaft 106. The solar panel mount 100 includes a fastener engagement member 107 (see FIG. 5A), such as a washer, to be coupled between a mounting shaft 106 and the solar panel mounting bracket 104. In some embodiments, the first plate 102 may include a flange 105 at the end closest to the mounting bracket 104 in order to facilitate easy installation.

Figure 2A:
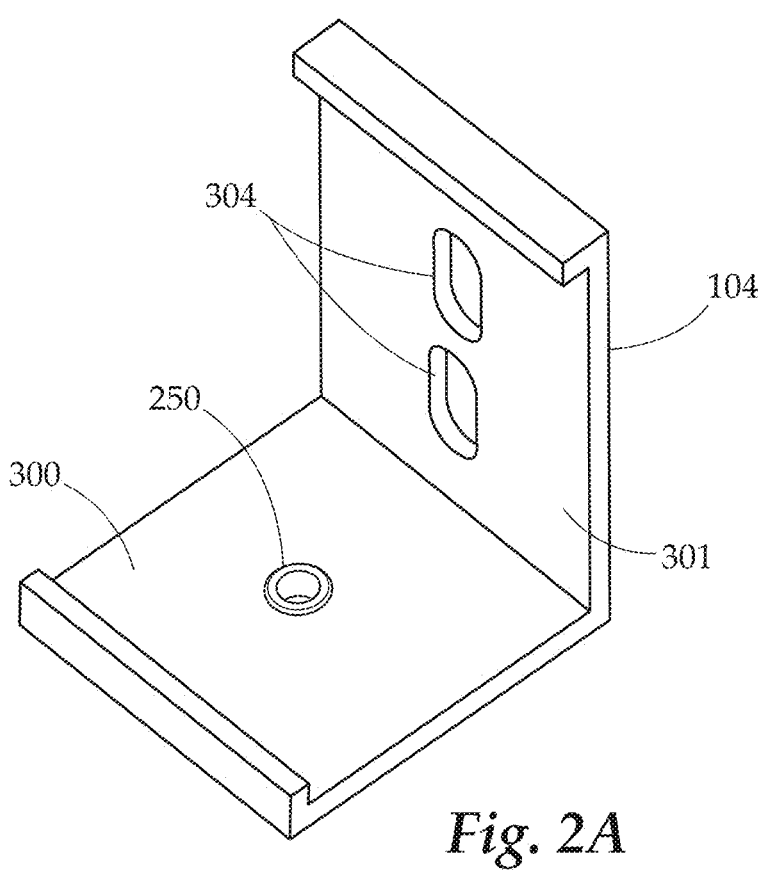
FIG. 2A is a top perspective view of a solar panel mounting bracket for use in a solar panel mount, such as the solar panel mount shown in FIG. 1 according to an exemplary embodiment.

Referring now to FIG. 2A, the solar panel mounting bracket 104 is shown in more detail. In the preferred embodiment, the solar panel mounting bracket 104 is an L-shaped bracket. In the preferred embodiment, the L-shaped bracket is comprised of a first portion 300, and a second portion 301, wherein the second portion 301 extends outwardly from the first portion 300 in a perpendicular orientation and include at least one channel 304. The first portion 300 includes a conical-shaped channel 302 that allows the mounting shaft 106 to slide through.

Figure 2B:
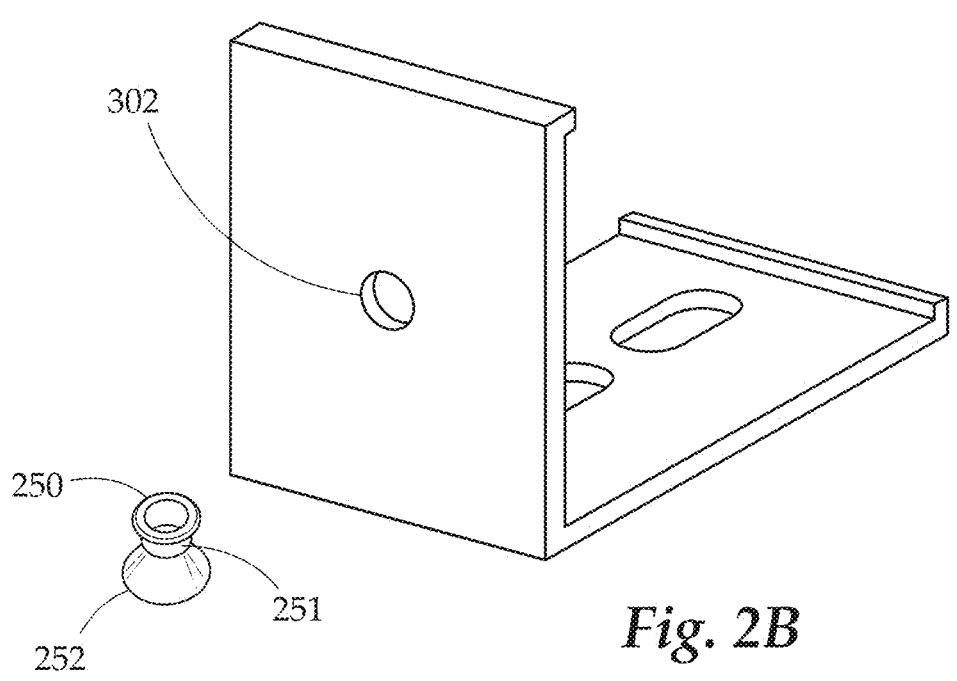
FIG. 2B is a bottom perspective view of a solar panel mounting bracket for use in a solar panel mount.

FIG. 2B refers to another embodiment of the mounting bracket where the first portion 300 includes a conical-shaped channel 302 that is preferably conical in shape in order to receive a rubber gasket 250 that is also preferably conical in shape. The rubber gasket 250 in combination with a sealant is received in the first portion of the solar panel mounting bracket 104. The rubber gasket 250 is hollow, with an upper portion 251, and a lower portion 252 that create a cone-like shape. The upper portion 251 has a lip that when it is placed through the channel 302 the lip directly connects with the fastening engagement member 107, and the lower portion 252 directly abuts a beveled divider 110 (see FIG. 5A). The fastening engagement member 107 and the rubber gasket 250 provide sealing qualities to the solar panel mounting bracket 104 and the solar panel mount 100. The mounting shaft 106 is placed through the rubber gasket 250 when the solar panel mount is fully assembled.

Figure 3A:
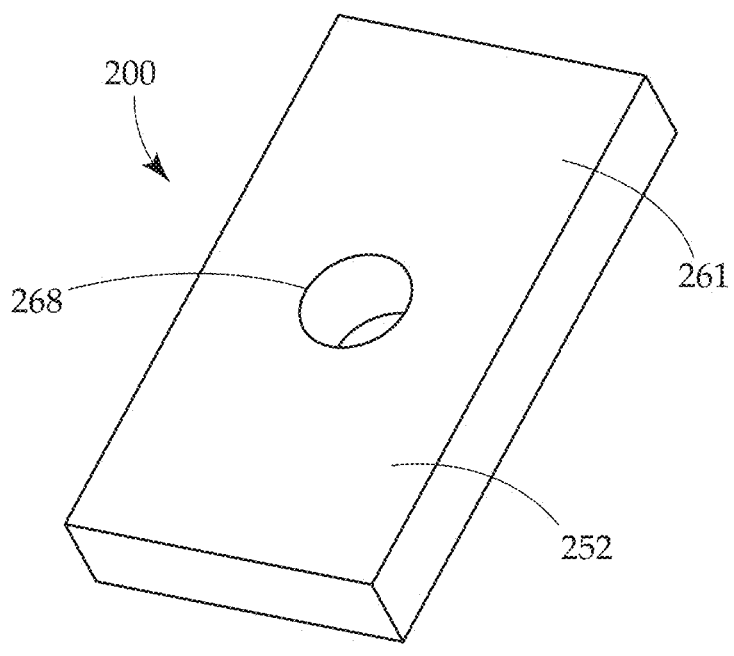
FIG. 3A is a front perspective view of one embodiment of a mounting member, according to an exemplary embodiment.
Figure 3B:
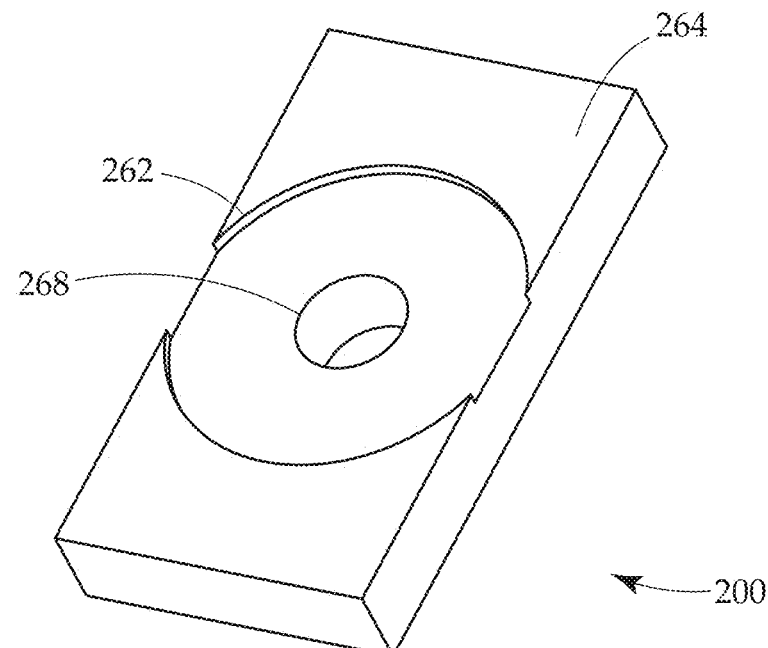
FIG. 3B is a rear perspective view of the mounting member of FIG. 3A.
Figure 3C:
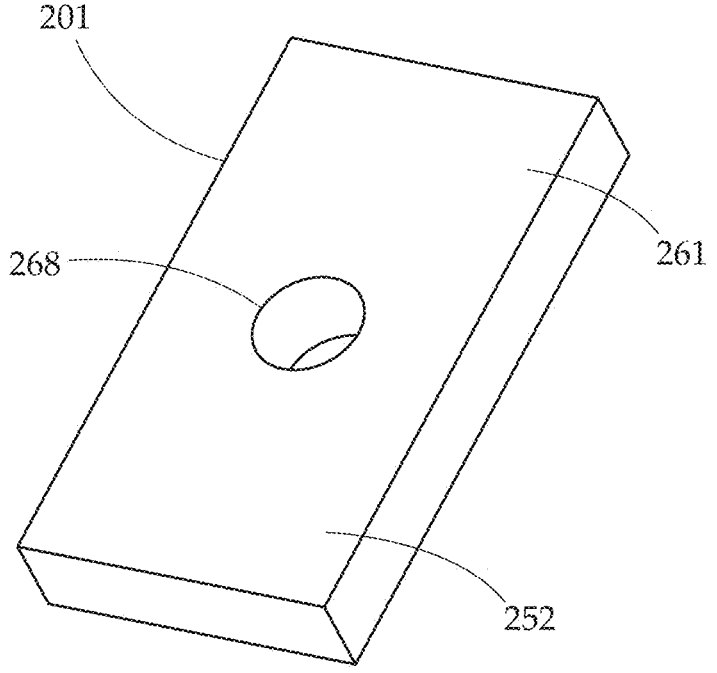
FIG. 3C is a front perspective view of another embodiment of the mounting member, according to an exemplary embodiment.
Figure 3D:
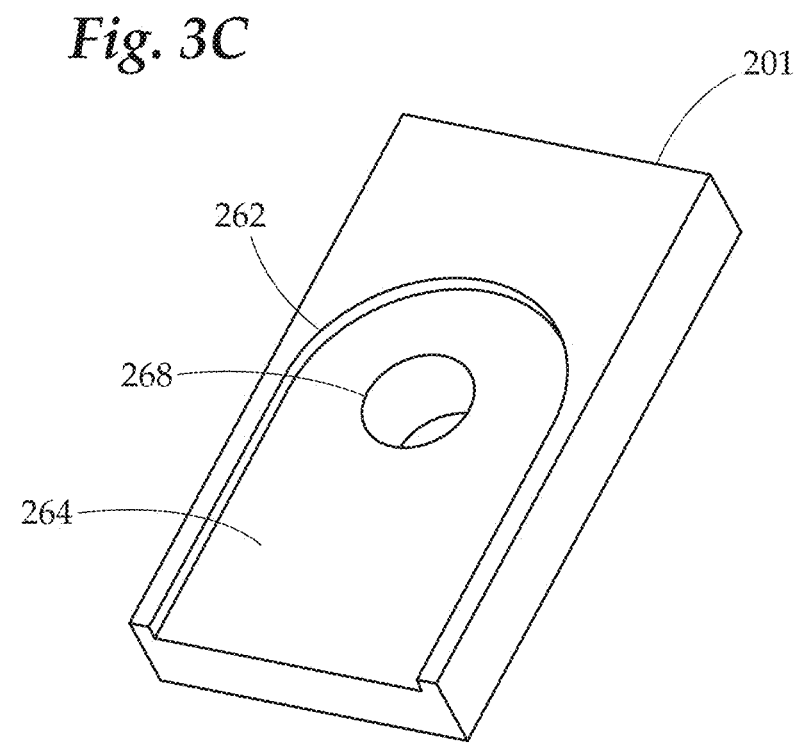
FIG. 3D is a rear perspective view of the mounting member of FIG. 3C.

FIGS. 3A-3D show the mounting member in more detail. The mounting member 200 includes a body 261 including a first surface 252 and a second surface 254 spaced from the first surface 252. When received in a cavity 220 of the plate 102, the first surface 252 is closer to the plate 102 than the second surface 254. The body 261 defines at least one channel 268 extending through the body 261 from the first surface 252 to the second surface 254. In some embodiments, a bottom side 260 (as shown in FIG. 3B) of the mounting member 200 includes a mounting wall 262 defining a mounting cavity 264. The mounting wall 262 is shown to extend into the mounting member 200, which can enable the rotatably adjustable spacer 150 to be guided into position relative to a channel 268 of the mounting member 200 through which the mounting shaft 106 is received in the rotatably adjustable spacer 150.

Figure 4A:
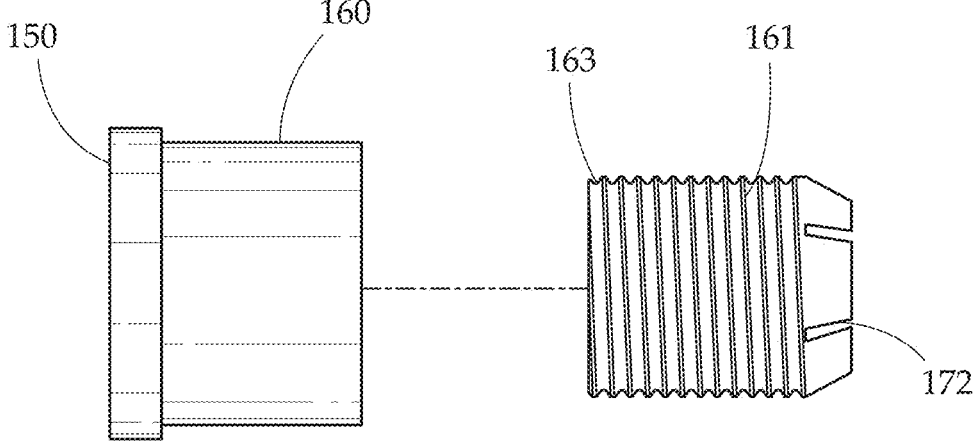
FIG. 4A is an exploded front perspective of the rotatably adjustable spacer.
Figure 4B:
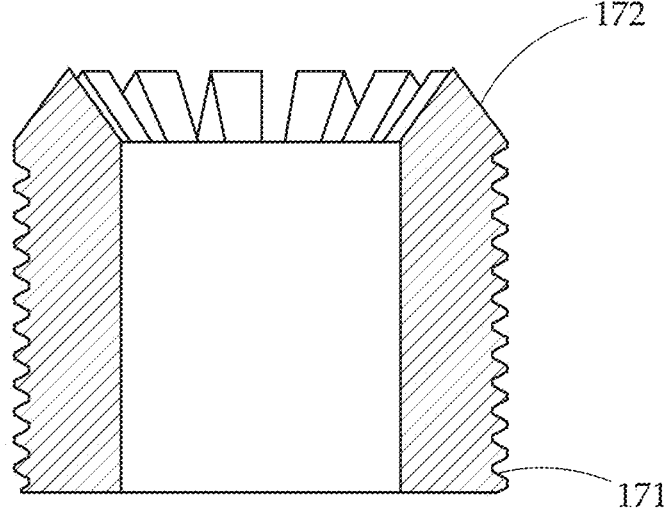
FIG. 4B is a cross-section of the rotatably adjustable spacer.
Figures 4C, 5A:
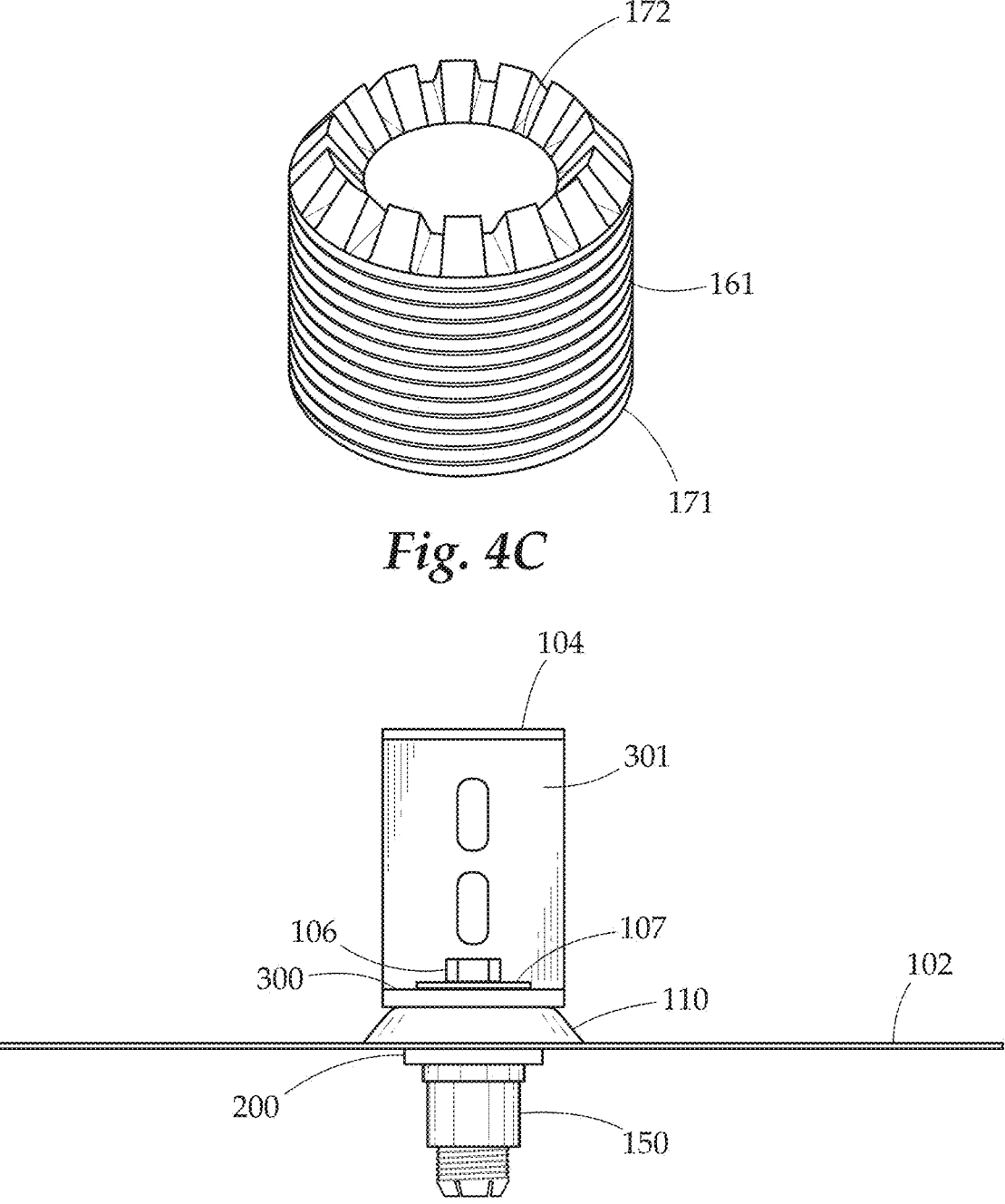
FIG. 4C is the inner rotating member of the rotatably adjustable spacer.
FIG. 5A is a front perspective view of a solar panel mount, according to an exemplary embodiment.
Figure 5B:
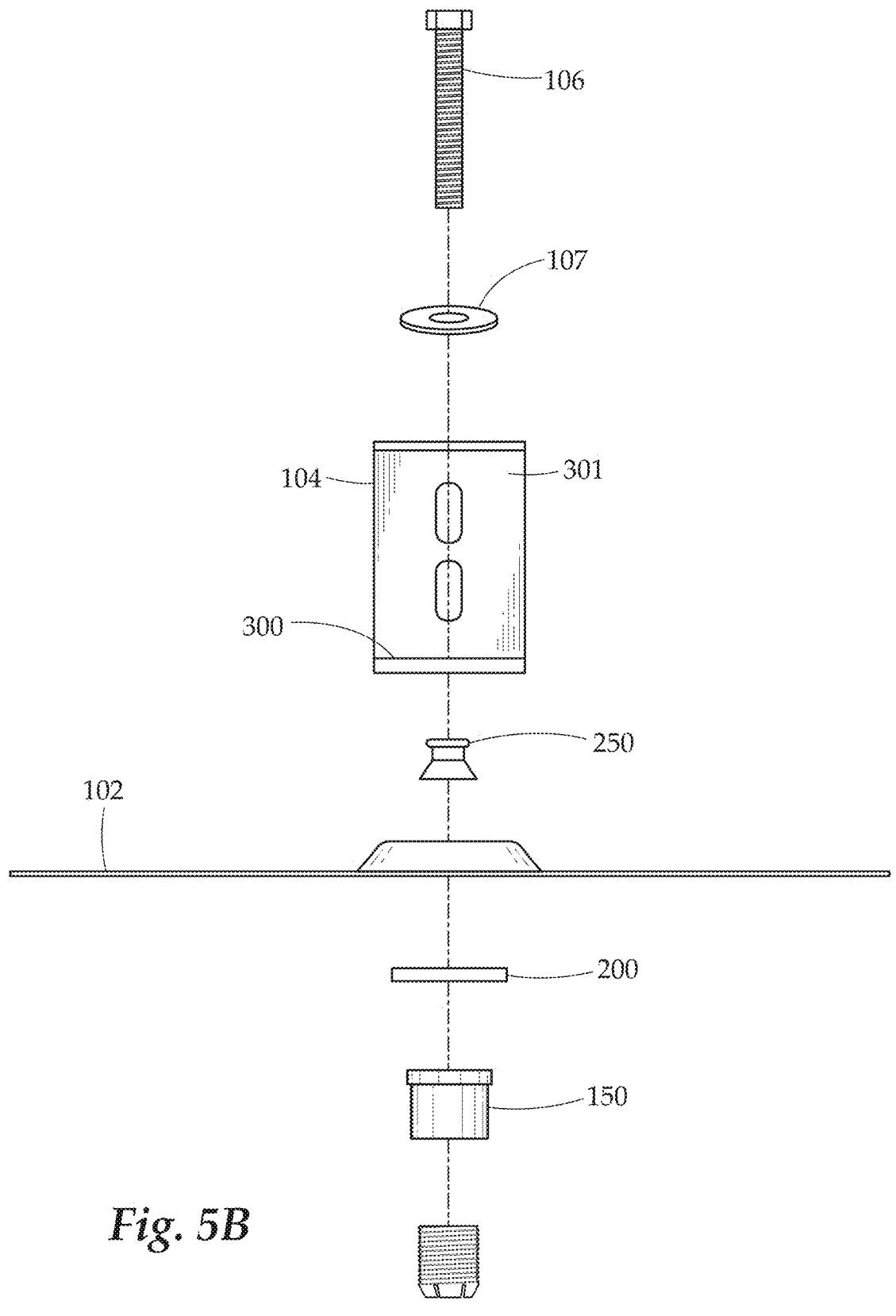
FIG. 5B is an exploded front perspective view of the solar panel mount with mounting member.
Figure 5C:
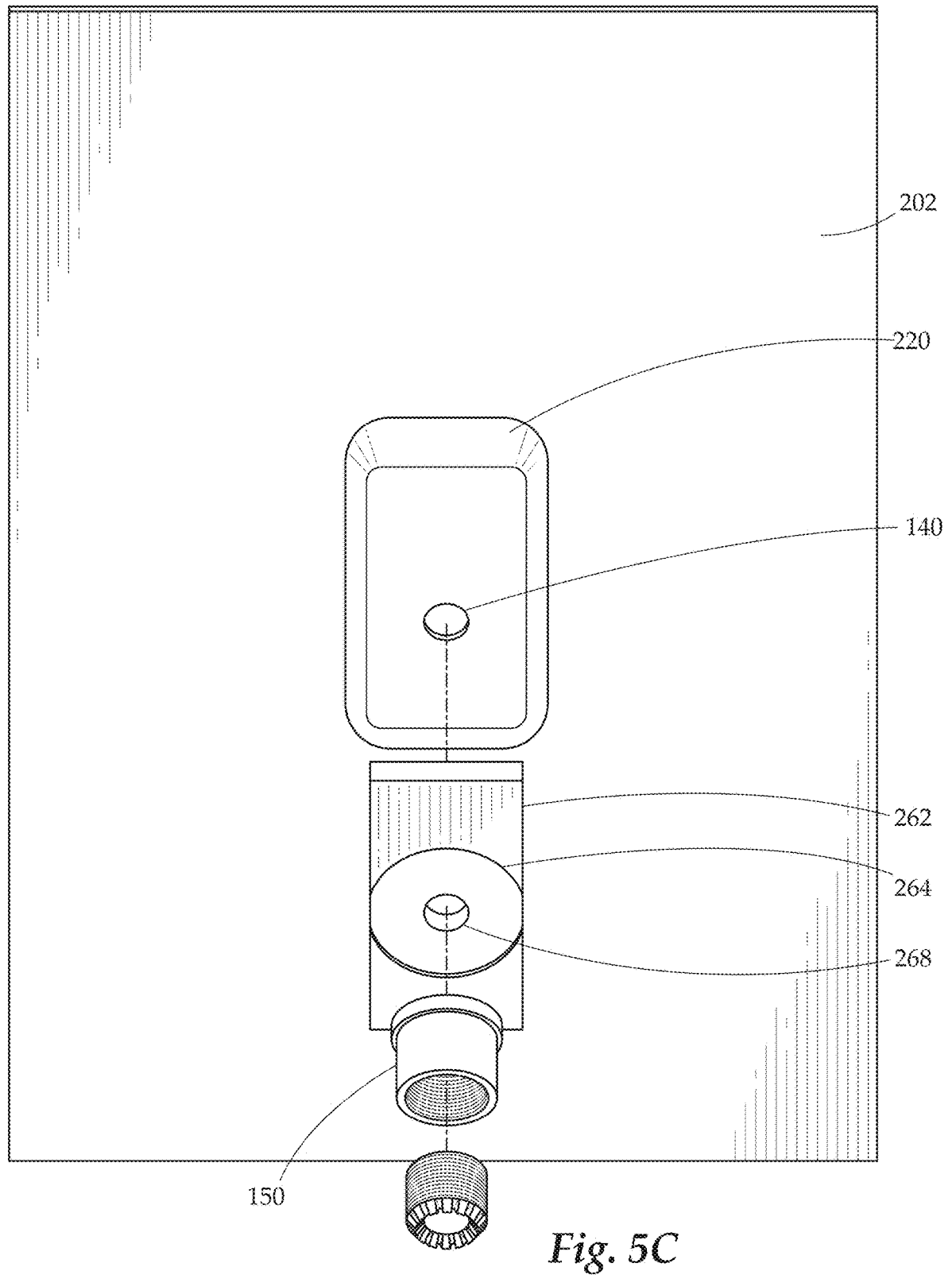
FIG. 5C is an exploded bottom perspective of the solar panel mount.

FIGS. 4A-4C show the rotatably adjustable spacer component 150. The solar panel mount 100 includes a rotatably adjustable spacer 150. The rotatably adjustable spacer 150 receives the mounting shaft 106. In a preferred embodiment, the rotatably adjustable spacer 150 also receives a sealant to create a water tight seal. The rotatably adjustable spacer 150 is preferably cylindrical in shape and allows for the distribution of even and constant force creating even spacing in the solar panel mount 100, by having an inner rotating member 161 and an outer shell 160 that work in tandem. As shown in FIG. 4A the outer shell 160 is threaded on an inner surface 162 (not shown), and the inner rotating member 161 is threaded on an outer surface 163. The threads of the outer surface 163 engage with the threaded inner surface 162 of the outer shell 160 when fully assembled. When the inner rotating member 161 and the outer shell 160 rotate together this allows for the rotatably adjustable spacer 150 to become flush with the roof or aligned with the surrounding roofing material. The rotatably adjustable spacer 150 can be received in the cylindrical shaped mounting cavity 264 of the mounting member 200. A ratio of a height of the rotatably adjustable spacer 150 (e.g., in a direction along which the mounting shaft 106 is received in the rotatably adjustable spacer 150) to a length of the mounting shaft 106 can be less than a one to two ratio, so as to enable the rotatably adjustable spacer 150 to have sufficient size to rotate sufficiently with respect to forces from the solar panel mount 100, while allowing the mounting shaft 106 to have sufficient length for insertion into the roof substrate.

Referring to FIG. 4C, the inner rotating member 161 has a first end 171 and a second end 172. The first end 171 is what is screwed or rotated into the outer shell 160. The second end 172 extends past the bottom edge of the outer shell 160. The second end 172 preferably narrows in shape forming a convex alignment.

The rotatably adjustable spacer 150 can fully rotate/wind (e.g., have a greater rotation than the plate 102 and/or expected compressibility of a roofing tile), in some embodiments. The rotatably adjustable spacer 150 can be fully rotated and/or wound in response to forces applied to the solar panel mount 100 over time, so as to reduce the transmission of such forces to surrounding roofing tiles and the roof substrate to which the solar panel mount 100 is attached. For example, it will be appreciated that forces that would cause the mounting shaft 106 to shift over time (and thus be transferred to the roof substrate or other roofing tiles) can be dampened by the rotatably adjustable spacer 150. FIGS. 5A-5D show the solar panel mount assembly of the exemplary embodiment. The solar panel mount 100 consists of a first plate 102, a solar panel mounting bracket 104, a mounting shaft 106, a fastener member 107, a mounting member 200, and a rotatably adjustable spacer 150. The mounting member 200, which can be received within a beveled cavity 220 of the first plate 102. When the mounting member 200 is received within the cavity 220, the mounting member 200 becomes flush with the first plate 102. The mounting member 200 couples with the first plate 102 and the mounting bracket 104 to couple the solar panel mount 100 to the roof substrate.

The cavity 220 is defined by a beveled divider 110 of the first plate 102, which can extend from the first plate 102. The beveled divider 110 of the first plate 102 comprises the at least one opening 140 spaced from the first plate 102 through which the mounting shaft 106 can be received. The rubber gasket 250 allows secure placement and retention when the mounting shaft 106 travels through the mounting bracket 104, and the opening 140 of the first plate 102. The mounting shaft further travels through the cavity 268 of the mounting member 200, and the rotatably adjustable spacer 150 to allow for placement on the roof. In a preferred embodiment, the mounting member 200 is comprised of an aluminum steel, such as 6061 aluminum steel, or stainless steel.

FIG. 6 displays a flow diagram showing the installation process of the solar panel mount with a rotatably adjustable spacer. Initially at step 505, a hole is drilled into roof tile. Drilling a hole allows the roofing material to keep its integrity compared to removing the entire tile. Then, at step 510, a rectangular box is drawn around the drilled hole and cut from a roof tile. Next, at step 515 the plate is placed underneath the roof tile, making sure to align the drilled hole with the opening in the plate. Once the drilled hole is aligned with the opening in the plate, the opening can be filled with a sealant. Mounting the solar panel mount may include contacting a mounting member of the solar panel mount to the roof substrate. Mounting the solar panel mount may include aligning a plate of the solar panel mount between adjacent roof tiles on the roof substrate. In some embodiments, mounting the solar panel mount to the roof substrate includes sliding portions of the plate between adjacent roof tiles and the roof substrate.

In some embodiments, the portions of the plate may be slid between adjacent roof tiles until a flange 105 extending from the portions of the plate contact the adjacent roof tiles. At step 520, a solar panel mounting bracket is fastened to the plate of the solar panel mount. For example, a fastening member may be used to fasten the solar panel mounting bracket to the plate, and in turn to the mounting member and the roof substrate. In some embodiments, then at step 525, metal beams are laid across the solar panel brackets, thus connecting the solar panel mounts to allow for the installation of the solar panels. Further, at step 530 a solar panel (or an assembly supporting a solar panel) is mounted to the solar panel mounting bracket.

References herein to the positions of elements (e.g., "top," "bottom," "above," "below," etc.) are merely used to describe the orientation of various elements in the Figures. It should be noted that the orientation of various elements may differ according to other exemplary embodiments and that such variations are intended to be encompassed by the present disclosure.

The construction and arrangement of the elements of the solar panel mount, and all other elements and assemblies as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements, the position of elements may be reversed or otherwise varied, and the nature or number of discrete elements or positions may be altered or varied.

Other substitutions, modifications, changes, and omissions may also be made in the design, operating conditions, and arrangement of the various exemplary embodiments without departing from the scope of the present invention. For example, any element disclosed in one embodiment may be incorporated or utilized with any other embodiment disclosed herein. Also, for example, the order or sequence of any process or method steps may be varied or re-sequenced according to alternative embodiments. Any means-plus-function clause is intended to cover the structures described herein as performing the recited function and structural equivalents and equivalent structures.

Other substitutions, modifications, changes, and omissions may be made in the design, operating configuration, and arrangement of the preferred and other exemplary embodiments without departing from the scope of the appended claims.

What is claimed is:

1. A solar panel mount, the solar panel mount comprising:
a first plate, the first plate further comprising:
    a first opening for a mounting shaft to slide through; and
    a beveled divider comprising a beveled cavity to receive a mounting member;
a mounting bracket, the mounting bracket being L-shaped and further comprising:
    a first portion with the channel;
    a second portion perpendicular to the first portion; and
    a channel on the first portion for a mounting shaft to slide through;
a mounting shaft configured to slide through the opening of the first plate, the channel, and an opening of mounting member;
a mounting member configured to receive a rotatably adjustable spacer and to slide into the beveled cavity and further comprising an opening for the mounting shaft to slide through;
a rotatably adjustable spacer, the rotatably adjustable spacer configured to adjust to a specific size and to receive the mounting shaft and further comprises:
    an inner rotating portion comprised of threads on an outer portion; and an
    outer shell portion, the outer shell portion comprising threads on an inside portion which receive the inner rotating portion and allow for adjustment in length when rotated.

2. A solar panel mount, the solar panel mount comprising:
a first plate, the first plate further comprising:
    a first opening for a mounting shaft to slide through; and
    a beveled divider comprising a beveled cavity to receive a mounting member wherein the beveled divider comprises the opening and is placed on a lower portion of the first plate;

a mounting bracket, the mounting bracket being L-shaped
and further comprising:
  a first portion with the channel;
  a second portion perpendicular to the first portion; and
  a channel on the first portion for a mounting shaft to
    slide through;
a mounting shaft configured to slide through the opening
  of the first plate, the channel, and an opening of the
  mounting member;
a mounting member configured to receive a rotatably
  adjustable spacer and to slide into the beveled cavity
  and further comprising an opening for the mounting
  shaft to slide through;
a rotatably adjustable spacer, the rotatably adjustable
  spacer configured to adjust to a specific size and to
  receive the mounting shaft and further comprises:
    an inner rotating portion comprised of threads on an
      outer portion; and an
    outer shell portion, the outer shell portion comprising
      threads on an inside portion which receive the inner
      rotating portion and allow for adjustment in length
      when rotated.

3. The solar panel mount of claim 1, wherein the beveled
divider comprises the beveled cavity on a side of the first
plate which faces the mounting member and is configured to
receive the mounting member.

4. The solar panel mount of claim 1, wherein the first plate
comprises a flange on a lower portion configured to allow
easy installation of the solar panel mount.

5. The solar panel mount of claim 1, wherein the channel
of the mounting bracket is conical shaped and extends from
a first surface of the mounting member to a second surface.

6. The solar panel mount of claim 1, wherein the mount-
ing bracket further comprises a rubber gasket attachment
which may sit in the channel where the mounting shaft slides
through to allow for a more comprehensive seal.

7. The solar plate mount of claim 1, wherein the mounting
shaft receives a fastener member configured to further
secure the mounting shaft in place.

8. The solar panel mount of claim 1, wherein the inner
rotating portion rotates into the outer shell portion and
allows the rotatably adjustable spacer to become flush with
a roof and surrounding roofing material.

9. A method of assembling the solar panel mount of claim
1 comprising the steps of:
  drilling an initial hole into roof tile;
  cutting out a rectangular shaped portion from the roof tile;
  placing the rotatably adjustable spacer into the initial
    hole;
  placing the first plate underneath a top roofing tile;
  aligning the initial hole, the mounting member, and the
    opening of the first plate;
  filling the initial hole with a sealant;
  sliding the mounting shaft through the channel of the
    mounting bracket along with a fastener member;
  sliding the mounting shaft through the opening in the first
    plate and drilling the mounting shaft to the mounting
    bracket and through the first plate, mounting member,
    and rotatably adjustable spacer; and
  installing a solar panel to the solar panel mount.

* * * * *